(12) United States Patent
Deng et al.

(10) Patent No.: US 6,919,989 B1
(45) Date of Patent: Jul. 19, 2005

(54) INTEGRATED OPTICAL ISOLATOR AND POLARIZATION BEAM COMBINER

(75) Inventors: Qi Deng, Cupertino, CA (US); Xiwen Wang, Coram, NY (US); Bing Zhang, San Jose, CA (US); Liren Du, San Jose, CA (US); Shuqing Ma, Sunnyvale, CA (US); Yonglin Huang, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/697,725

(22) Filed: Oct. 30, 2003

Related U.S. Application Data
(60) Provisional application No. 60/422,211, filed on Oct. 30, 2002.

(51) Int. Cl.[7] ............................. G02B 27/28; G02B 5/30
(52) U.S. Cl. ........................ 359/494; 359/495; 359/280
(58) Field of Search ................................. 359/618, 280, 359/494, 495, 496, 497, 498, 499, 500; 385/11

(56) References Cited

U.S. PATENT DOCUMENTS

| | | | |
|---|---|---|---|
| 6,285,499 B1 * | 9/2001 | Xie et al. .................... | 359/484 |
| 6,331,912 B1 * | 12/2001 | Au-Yeung et al. .......... | 359/484 |
| 6,587,273 B2 * | 7/2003 | Xue et al. ................... | 359/618 |
| 2002/0089745 A1 | 7/2002 | Huang et al. | |
| 2002/0110307 A1 | 8/2002 | Huang et al. | |
| 2002/0181102 A1 * | 12/2002 | Leyva et al. ................ | 359/495 |
| 2003/0113055 A1 * | 6/2003 | Zhao et al. .................. | 385/16 |

OTHER PUBLICATIONS

Hiroshi Matsuura et al., "Production Engineering of Polarization Beam Combiner," 2001 (4 pages).
AOC Technologies, Inc., "Polarization Beam Combiner and Isolator Hybrid," http://aoctech.com/product0801.htm, Oct. 9, 2003 (2 pages).
Wavesplitter Technologies, Inc., "WavePump Raman Pump Laser Combiner," Nov. 2001 (2 pages).
Wavesplitter Technologies, Inc., "WavePump 1480 & 980nm Pump Laser Combiner," Nov. 2001 (2 pages).

* cited by examiner

*Primary Examiner*—Ricky Mack
*Assistant Examiner*—Brandi Thomas
(74) *Attorney, Agent, or Firm*—Workman Nydegger

(57) ABSTRACT

A device functions as a polarization beam combiner and an isolator. When light is transmitted in a first propagation direction, a second beam is displaced towards a first beam. The second beam has a polarization orthogonal to the polarization of the first beam, and the second beam is substantially parallel to the first beam. The polarizations of the first and second beams are rotated by a same first amount in a first rotation direction and then rotated by the same first amount in a second opposite rotation direction. The first and second beams are combined by displacing the second beam towards the first beam. The combined beam is polarized along a first plane and second plane, which is orthogonal to the first plane. When light is transmitted in a second opposite propagation direction, the device is used to provide optical isolation.

17 Claims, 7 Drawing Sheets

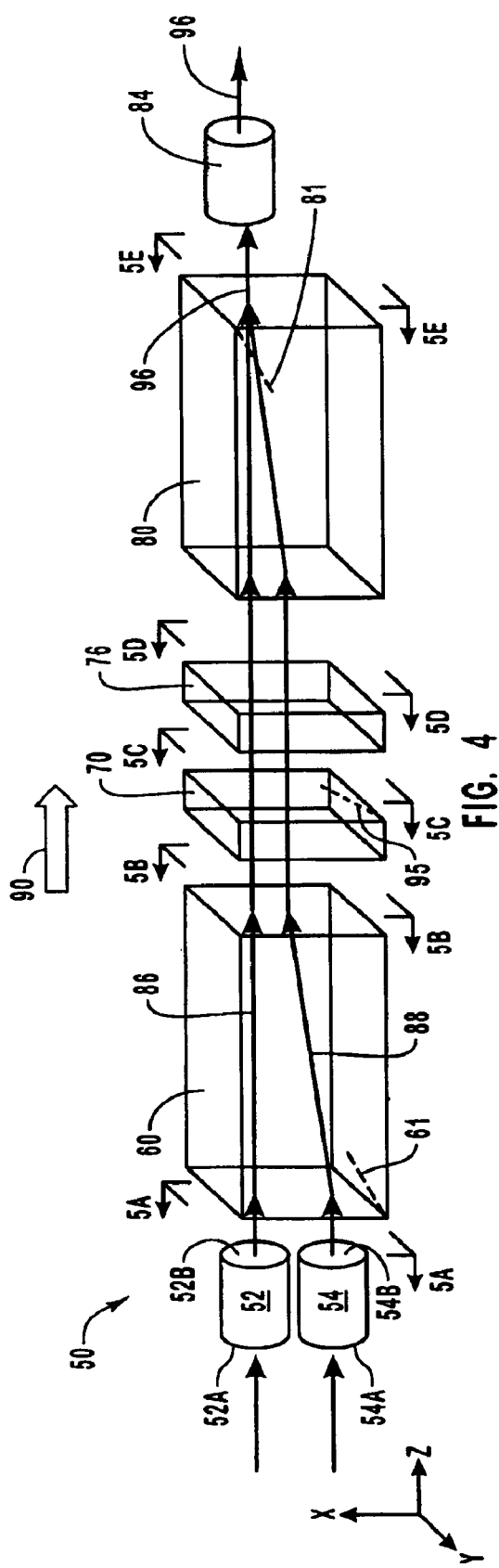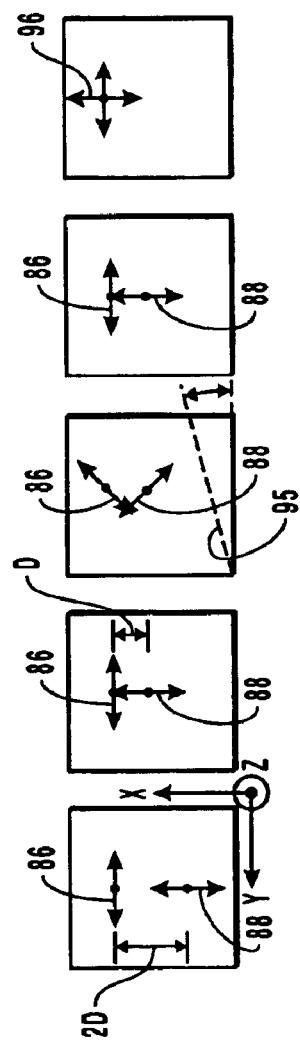

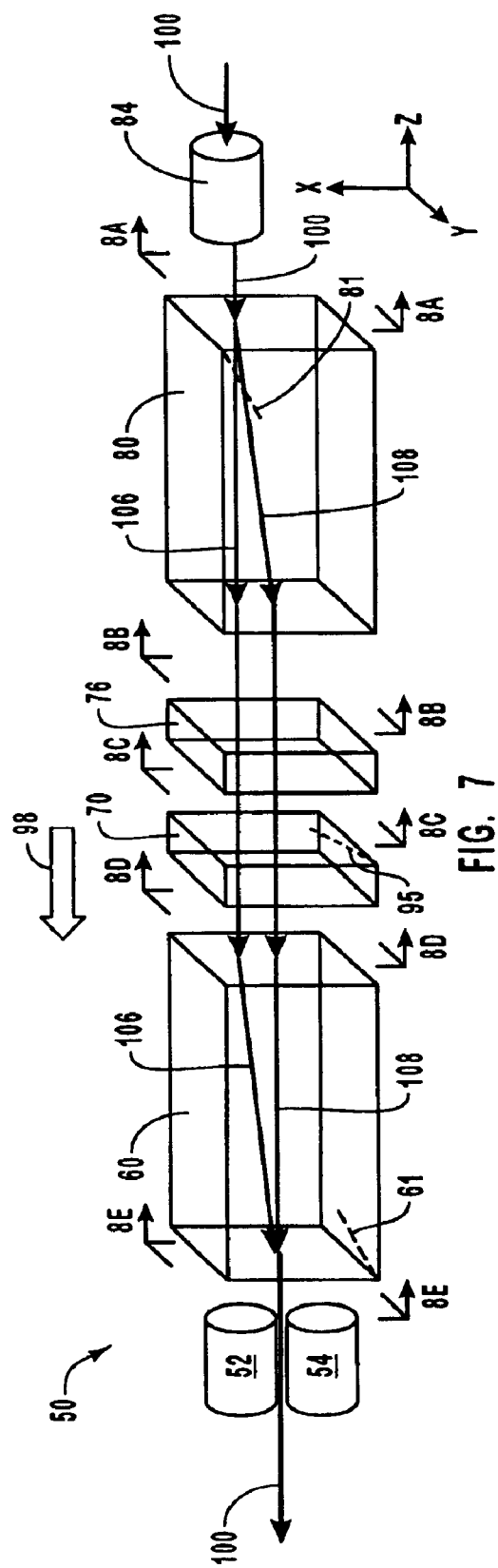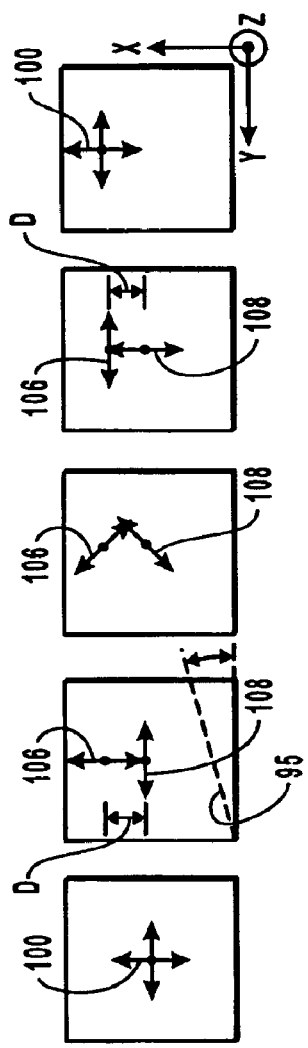

INTEGRATED OPTICAL ISOLATOR AND POLARIZATION BEAM COMBINER

CROSS-REFERENCE TO RELATED APPLICATIONS

This application claims the benefit of U.S. Provisional Application No. 60/422,211, filed Oct. 30, 2002, which is incorporated herein by reference in its entirety.

BACKGROUND OF THE INVENTION

1. The Field of the Invention

The present invention generally relates to a device which functions as a polarization beam combiner and an isolator, and more particularly, a device that can combine two beams of polarized light into one beam and provide optical isolation in the reverse direction.

2. The Related Technology

Polarization beam combiners ("PBCs") and optical isolators are prevalent in modem optical communications systems. PBCs, which combine two plane-polarized optical signals into a single combined signal, and optical isolators, which prevent the back-reflection of an optical signal, are employed as separate components in a variety of optical apparatus, including optical amplifiers, transceiver modules, etc.

As mentioned, one application where both a PBC and optical isolator can be used is in an optical amplifier, such as Raman amplifier or erbium-doped fiber amplifier (EDFA). These amplifiers are used to increase the strength of an optical signal to enable its transmission over large distances. A PBC is typically employed within the amplifier to combine polarized signals from two pump lasers into a combined signal for use in amplifying a data-containing main signal. Correspondingly, an optical isolator can be used to prevent back-reflection of the polarized signals back toward the pump lasers in order to optimize their operation.

As the size of such devices is progressively reduced due to advancements in technology, new means are continually being sought to minimize the amount of space occupied by components located within the device. Thus, to the extent that the space requirements of PBCs and optical isolators can be minimized, the utility of optical amplifiers and similar devices is improved.

Concurrent with the above concern is the ever-present aim of reducing the complexity of optical devices, including optical amplifers, PBCs, optical isolators, etc. To the extent that an optical device can be simplified in design, the cost to produce the device is reduced while its utility in a greater number of applications is increased. As such, common optical devices, such as optical amplifiers that include numerous interior components, present a particular challenge in terms of maximizing device simplicity.

In view of the above, a need exists in the art for an optical device that overcomes the above challenges. In particular, a need exists for an optical device that can perform polarization beam combination operations while also reducing or eliminating optical back-reflection. Furthermore, any solution to these needs should be implemented in a simple design that is able to reduce the overall complexity of the apparatus or device in which the solution is disposed.

BRIEF SUMMARY OF THE INVENTION

The present invention has been developed in response to the above and other needs in the art. Briefly summarized, embodiments of the present invention are directed to an integrated polarization beam combiner and optical isolator ("PBCI"). The PBCI of the present invention combines the functionality of a polarization beam combiner and an optical isolator in one package for use in a variety of configurations in optical systems, including optical communications networks. The present PBCI employs a simple design that cooperates with its integrated configuration to decrease both the number and complexity of sub-components within an optical device, such as an optical amplifier.

In one embodiment, the PBCI includes a plurality of components arranged in a predetermined configuration to receive and manipulate beams of optical signals. First and second collimators are positioned at one end of the PBCI. A first beam displacer, wave plate, Faraday rotator, and second beam displacer are positioned in series after the first and second collimators, followed by a third collimator.

In a first, beam combining implementation, first and second optical beams that are plane-polarized orthogonally to one another are introduced into the PBCI via the first and second collimators, respectively. The beams travel in a first, or forward, propagation e direction. After collimation by the first and second collimators, the two beams are passed through the first beam displacer, which causes the second beam to be deflected a predetermined distance toward the first beam. The two beams are then passed through the wave plate and Faraday rotator, which rotate the polarization of each beam in a predetermined manner. The beams are then passed through the second beam displacer, which causes the second beam to further deflect toward the first beam until the two beams merge into a combined beam having dual-plane polarization. The combined beam is then directed out of the PBCI via the third collimator.

In a second, beam isolation implementation, a combined optical beam having a dual polarization is introduced into the PBCI via the third collimator. The combined beam corresponds to an undesired back-reflected beam that is traveling in a second, or backward, propagation direction. After collimation by the third collimator, the beam is passed through the second beam displacer, which causes the beam to separate into first beam and second beams having orthogonal plane polarizations with respect to one another. The two beams are then passed through the Faraday rotator and wave plate, which together rotate the polarizations of each beam by 90 degrees. The beams are then passed through the first beam displacer, which causes the first beam to deflect toward the second beam until the two beams merge into a dual-plane polarized combined beam once again. As a result of the above process, the newly combined beam is positioned upon exiting the first beam displacer such that it does not enter either the first or second collimators, thereby preventing its passage from the PBCI as back-reflected light.

In another embodiment an array PBCI can be employed, wherein multiple beams can be passed through the array PBCI simultaneously, thereby increasing the beam capacity of the device.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 is a block diagram showing various stages of the present integrated polarization beam combiner and optical isolator functioning in a first operating state, according to one embodiment;

FIG. 5A is a block diagram illustrating the polarization of an upper and lower beam of light before they enter the second stage of the integrated polarization beam combiner and optical isolator of FIG. 4;

FIG. 5B is a block diagram illustrating the optical polarization of an upper and lower beam of light as they exit the second stage of the integrated polarization beam combiner and optical isolator of FIG. 4;

FIG. 5C is a block diagram illustrating the optical polarization of an upper and lower beam of light as they exit the third stage of the integrated polarization beam combiner and optical isolator of FIG. 4;

FIG. 5D is a block diagram illustrating the optical polarization of an upper and lower beam of light as they exit the fourth stage of the integrated polarization beam combiner and optical isolator of FIG. 4;

FIG. 5E is a block diagram illustrating the optical polarization of a combined beam of light as it exits the fifth stage of the integrated polarization beam combiner and optical isolator of FIG. 4;

FIG. 7 is a block diagram showing various stages of the present integrated polarization beam combiner and optical isolator functioning in a second operating state, according to one embodiment;

FIG. 8A is a block diagram illustrating the optical polarization of a beam of light before it enters the second stage of the integrated polarization beam combiner and optical isolator of FIG. 7;

FIG. 8B is a block diagram illustrating the optical polarization of an upper and lower beam of light after they exit the second stage of the integrated polarization beam combiner and isolator of FIG. 7;

FIG. 8C is a block diagram illustrating the optical polarization of an upper and lower beam of light after they exit the third stage of the integrated polarization beam combiner and optical isolator of FIG. 7;

FIG. 8D is a block diagram illustrating the optical polarization of an upper and lower beam of light after they exit the fourth stage of the integrated polarization beam combiner and isolator of FIG. 7;

FIG. 8E is a block diagram illustrating the optical polarization of an upper and lower beam of light after they exit the fifth stage of the integrated polarization beam combiner and optical isolator of FIG. 7.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–9 illustrate various features of embodiments of the present invention, which is generally directed to an integrated polarization beam combiner and optical isolator for use in optical systems. Use of the present polarization beam combiner and optical isolator in an optical device enables space savings to be achieved by virtue of its integrated nature. Further, simplicity of the system is enhanced, owing to the compact and simple design of the polarization beam combiner and optical isolator.

Figure 1:
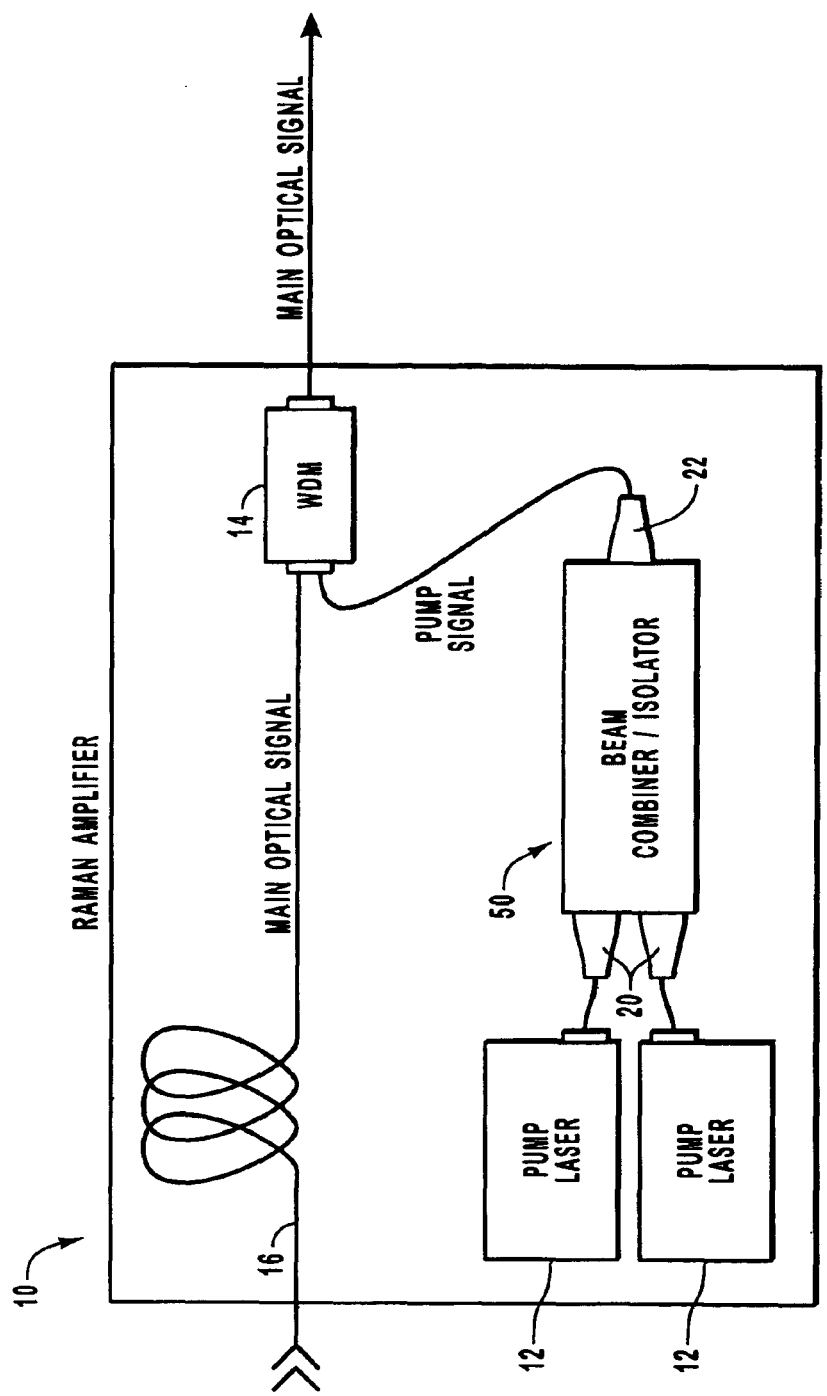
FIG. 1 is a simplified schematic diagram of one environment in which the present integrated polarization beam combiner and isolator can be practiced.

Reference is first made to FIG. 1, which illustrates an exemplary implementation in which embodiments of the present invention can be practiced. FIG. 1 shows a Raman amplifier 10 used to amplify optical signals in an optical communications system. The Raman amplifier 10 includes several components, some of which are shown in FIG. 1, including two pump lasers 12, a wavelength division multiplexer ("WDM") 14, and an optical fiber 16 in communication with the WDM 14. Also included in the Raman amplifier 10 is an integrated polarization beam combiner and optical isolator ("PBCI") made in accordance with one embodiment of the present invention and generally designated at 50.

As will be discussed below, the PBCI 50 is employed within the Raman Amplifier 10 to combine plane-polarized optical signals produced by each of the pump lasers 12 into a combined, dual polarized optical beam. The PBCI 50 is further configured to prevent back-reflection of any optical signals back into the pump lasers 12. In accordance with embodiments of the present invention, the PBCI 50 is configured to accomplish both of these tasks as a single device.

Briefly, the Raman Amplifier 10 is configured to amplify a main optical signal that is transmitted into the Raman Amplifier via the optical fiber 16. Orthogonal, plane-polarized beams are each produced by the pump lasers 12, then inputted into the PBCI 50 via two inlets 20. The PBCI 50 combines the two orthogonal, plane-polarized beams into a single, dual-polarized combined beam while preventing back-reflection of light back into the pump lasers 12. The combined beam is output from the PBCI 50 via an outlet 22, then introduced into the WDM 14, along with the main optical signal from the erbium-doped fiber 16. Amplification of the main optical signal is then performed before the main optical signal is output from both the WDM 14 and the Raman Amplifier 10. In this way, optical signals can be amplified for travel over great distances without suffering signal loss due to attenuation. Note that, while the Raman Amplifier shown in FIG. 1 is one possible environment in which the present PBCI can be utilized, a variety of other environments and devices can also benefit from the embodiments of the present invention.

Figure 2:
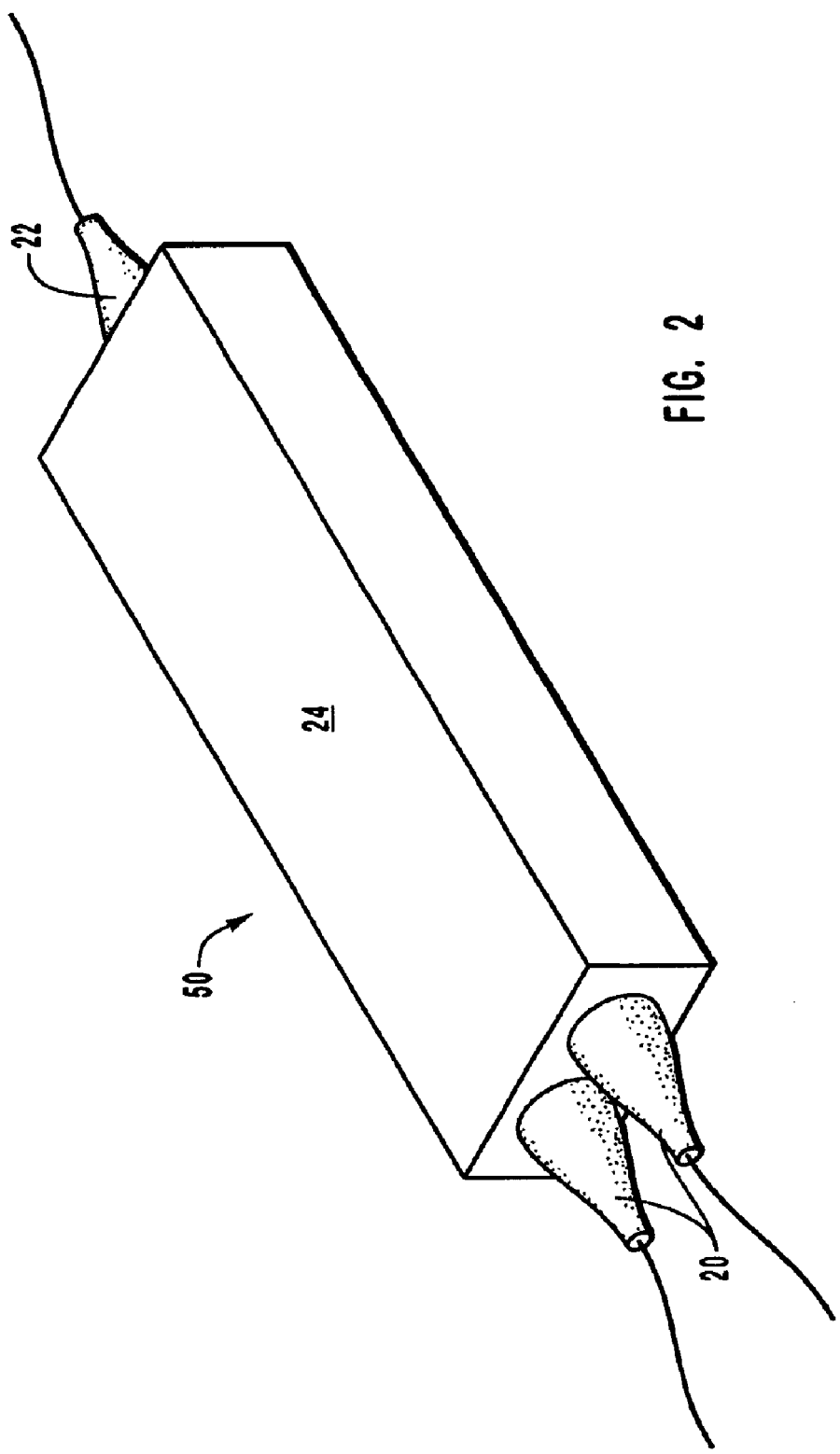
FIG. 2 is a perspective view of one embodiment of the present polarization beam combiner and isolator.

Reference is now made to FIG. 2, which shows, in perspective view, one embodiment of the present PBCI 50. As shown, the PBCI 50 includes a housing 24, as well as the two inlets 20 and the outlet 22 referred to in FIG. 1. In one embodiment, the inlets 20 include two pigtail assemblies having an optical fiber mated to a connector portion for connecting with the PBCI 50. Similarly, the outlet 22 in one embodiment includes a pigtail assembly having an optical fiber mated to a connector portion for connecting with the PBCI 50. Via the inlets 20 and the outlet 22, optical beams are both inputted and outputted to and from the PBCI 50 in accordance with the process shown in the accompanying figures. It is appreciated that the housing, inlets, and outlet shown in FIG. 2 are exemplary, and other configurations of each are possible.

Figure 3:
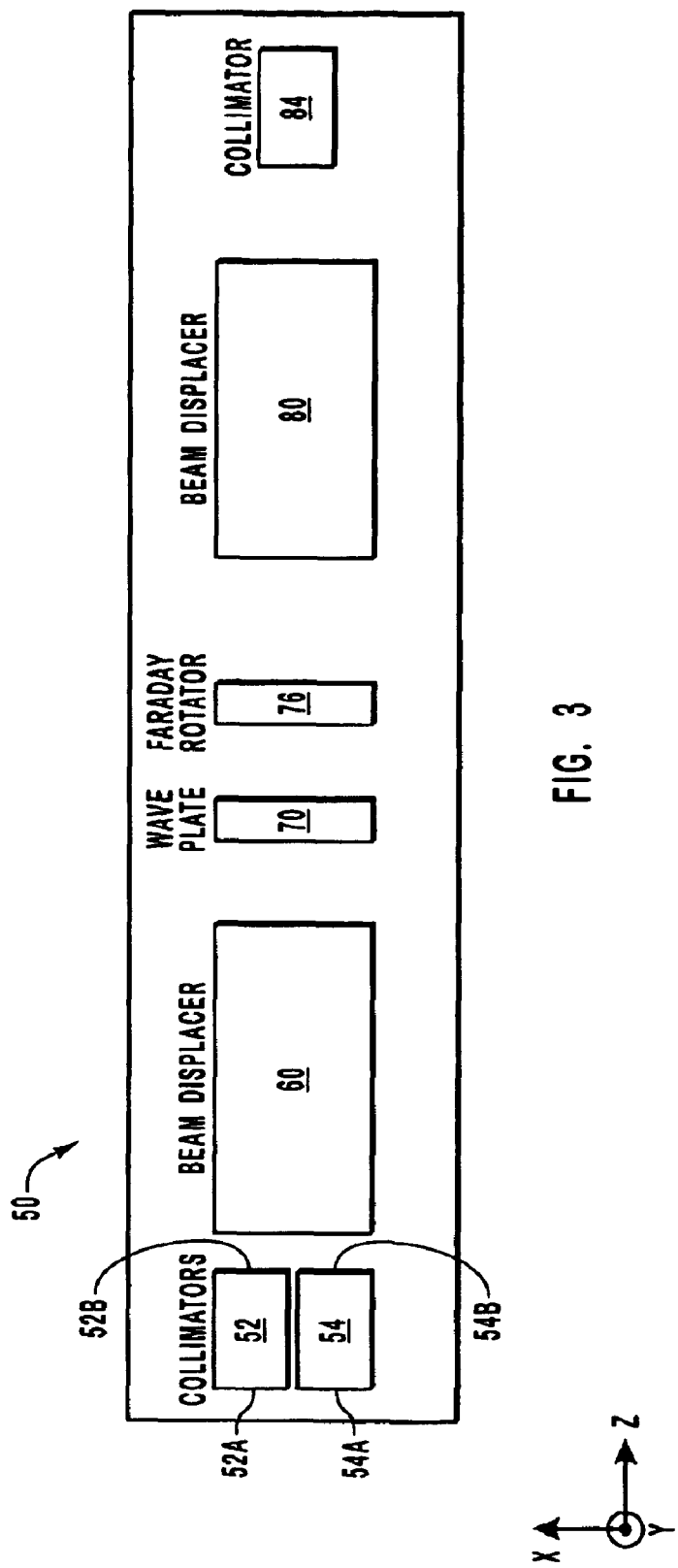
FIG. 3 is a simplified block diagram showing various components of the present integrated polarization beam combiner and optical isolator according to one embodiment.

Reference is now made to FIG. 3, depicting a side view of one embodiment of the PBCI 50. As shown in FIG. 3, the PBCI 50 includes six stages. The first stage includes first and second collimators 52 and 54 that here include cylindrical lenses having a longitudinal axis. The lenses of the first and second collimators are oriented in this embodiment such that the longitudinal axis of one lens is directly above (and parallel to) the longitudinal axis of the second lens. An optical fiber is coupled to a first end 52A and 54A of each of the first and second collimators 52 and 54, respectively.

The second stage of the PBCI 50 includes a first beam displacer 60. FIG. 3 shows the first beam displacer 60 as a slab having a predetermined length L. In one embodiment, the first beam displacer 60 can be composed of a birefringent crystal, and is positioned within the PBCI 50 in series with the first and second collimators 52 and 54.

The third stage of the PBCI 50 is positioned in series with the first beam displacer 60 and includes a wave plate 70. In the present embodiment, the wave plate 70 is a half-wave plate composed of a birefringent crystal. In addition, other materials and wave plate(s) of different types can also be acceptably used.

The fourth stage of the PBCI 50 includes a Faraday rotator 76. In the present embodiment, the Faraday rotator 76 is composed of a garnet stone. Moreover, the Faraday rotator of FIG. 3 is of the latching garnet type, such that no external magnetic field is necessary for its operation in connection with the PBCI 50. In other embodiments, however, a non-latching garnet Faraday rotator can be used. If so, the non-latching garnet should be exposed to an external magnetic field for proper operation.

The fifth stage of the PBCI 50 includes a second beam displacer 80 positioned in series with the Faraday rotator 76. Similar to the first beam displacer 60, the second beam displacer 80 can be composed of a birefringent crystal or other suitable material, and has a predetermined length L, which is the same as the length L of the first beam displacer. If desired, however, the respective lengths of the first and second beam displacers 60 and 80 can be different. Also, each beam displacer can be composed of differing materials, as one skilled in the art will appreciate.

The sixth stage of the PBCI 50 includes a third collimator 84 which, in the present embodiment, includes a cylindrical lens having a longitudinal axis. Like the first and second collimators 52 and 54, the third collimator 84 can alternatively include another type of collimating device.

Note that in FIG. 3, the wave plate 70 is in series with and precedes the Faraday rotator 76 in progression from the first beam displacer 60 to the second beam displacer 80. Alternatively, the respective positions of the wave plate 70 and the Faraday rotator 76 can be reversed, if desired.

Reference is now made to FIG. 4, which shows the PBCI 50 in a first operating state, wherein the PBCI is employed to combine two polarized light beams into a single light beam. A first beam 86 of light, polarized in a first plane, is transmitted from an optical fiber (not shown) or similar component to the first collimator 52 through the first end 52A thereof. A second beam 88 of light, polarized in a second plane that is orthogonal to the polarization plane of first beam 86, is transmitted from another optical fiber (not shown) or similar component to the second collimator 54 through the first end 54A thereof. Both beams 86 and 88 are directed through the first and second collimators 52 and 54, respectively such that the beams are collimated as to be substantially parallel to one another.

As indicated by the arrow 90, both the first and second beams 86 and 88 propagate in a first, or forward, propagation direction through the first and second collimators 52 and 54, respectively. The collimation of the first and second beams 86 and 88 helps ensure that the beams do not disperse, thereby keeping diameter of each light beam substantially the same as it travels in the Z-direction through stages 2–5 of the PBCI 50.

FIG. 5A illustrates the polarization planes of the first and second beams 86 and 88 as viewed from a position between the first and second collimators 52 and 54 and the first beam displacer 60. As shown in this and accompanying figures, the central position of each beam is indicated by a dot. The arrowed line passing through each dot of first and second beams 86 and 88 indicates the polarization plane of the respective light beam. Thus, the first beam of light 86 is shown in FIG. 5A to be polarized in the YZ-plane and, therefore oscillates along the Y-axis while the light beam is propagating in the Z-direction, which corresponds to the forward propagation direction. The second beam 88 of light is polarized along the XZ-plane and, therefore oscillates along the X-axis while the light beam propagates in the Z-direction. The polarization of the first and second beams 86 and 88 before and after propagation through the first and second lenses, respectively, remain the same.

The first and second collimators 52 and 54 are operably coupled to the first beam displacer 60 such that the first light beam 86 is transmitted from a second end 52B of the first collimator 52 into the first beam displacer 60. Similarly, the second beam 88 is transmitted from a second end 54B of the second collimator 54 into the first beam displacer 60.

As mentioned above, the first beam displacer 60 in one embodiment is composed of a birefringent crystal. As such, the first beam displacer 60 possesses two refractive indices, owing to the fact that the speed of light in a birefringent crystal varies according to the polarization of the light within the crystal. Thus, the first and second beams 86 and 88, having orthogonal respective polarizations, will be refracted differently by the crystal, thereby causing them to travel with different velocities through the first beam displacer 60. In the embodiment shown in FIG. 4, the first light beam 86 is referred to as the ordinary beam, or O-beam. The first beam 86 as the O-beam has a polarization that causes it to pass through the birefringent crystal and encounter a first index of refraction no. This causes the first beam 86 to travel without deflection through the first beam displacer 60.

In contrast, the second beam 88 is referred to as the extraordinary beam, or E-beam, in the present embodiment. The second beam 88 as the E-beam has a polarization that causes it to pass through the birefringent crystal and encounter a second index of refraction $n_E$. This causes the second beam 88 to travel through the first beam displacer 60 at a different speed than that of the first beam 86, which correspondingly causes the second beam to be deflected during its transit. In detail, the first beam displacer 60 causes deflection of the second beam 88, as the E-beam, closer to the first beam 86, as the O-beam, as they propagate through the first beam displacer 60 in the forward propagation direction. As a result, and as shown in FIG. 5B, the second beam 88 is located closer to the first beam upon exiting the first beam displacer 60. The polarizations of the first and second beams 86 and 88 are not affected by their passage through the first beam displacer 60.

Figure 6:
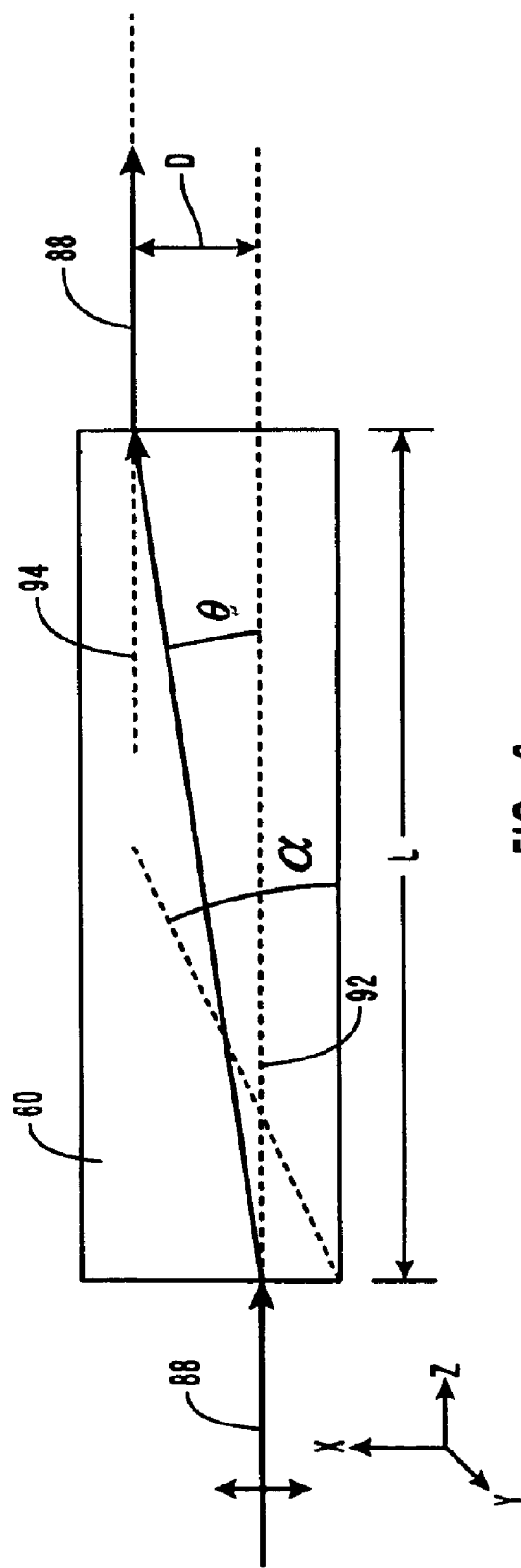
FIG. 6 is a side view of one of the beam displacer of the present illustration, illustrating beam walk off distance.

Reference is made to FIG. 6, which shows further details regarding the passage of the second beam 88 through the first beam displacer 60. As shown in FIG. 6, the distance between an original axis of propagation 92 of the second beam 88 as the E-beam, and its subsequent deflected axis of propagation 94 after passage through the first beam displacer 60 is referred to as a walk-off distance and is indicated by D in FIG. 6. Generally, for a beam displacer of length L, the walk-off distance D may be calculated by the following equation:

$$D = L \times \tan(\theta), \quad (1)$$

where θ is the angle at which the second beam deflects from the original axis of propagation 92 while traveling through the first beam displacer 60. The value of tan (θ) may be calculated by:

$$\tan(\theta) = (n_E^2 - n_O^2) \times \sin(\alpha) \times \cos(\alpha) / [n_O^2 \times \sin^2(\alpha) + n_E^2 \times \cos^2(\alpha)], \quad (2)$$

where α is the optical axis of the beam displacer, shown in the X-direction, $n_E$ is the refractive index of the E-beam, and no is the refractive index of the O-beam, as discussed above.

Reference is again made to FIG. 4. Once the first and second beams 86 and 88 have traveled through and exited the first beam displacer 60, they each proceed to the third stage of the PBCI 50, that is, the wave plate 70. Note that at this point (i.e., immediately prior to each beam entering the wave plate 70), the first beam 86 retains its original polarization and central position from when it was introduced into the PBCI 50 via the first collimator 52. The polarization of the second beam 88 at this point has also remained unchanged from its introduction into the PBCI 50 via the second collimator 54. The central position of the second beam 88, however, has changed as discussed above, in that it has moved closer to the first beam 86 by the amount of the walk-off distance D (see FIG. 6).

The wave plate 70 is used to rotate the polarization of the first and second light beams 86 and 88 without causing translation of the beam positions. The wave plate 70 shown in FIG. 4 is a half-wave plate, though other wave plate types or wave plate combinations can also be employed to provide the same function. In one embodiment, the half-wave plate has an optical axis 95 of 22.5° disposed in the XY-plane, as shown in FIGS. 4 and 5C. So configured, the wave plate 70 rotates the polarization of light beams propagating through the wave plate in a first propagation direction by 45° in a counterclockwise direction when viewed head-on.

The effect of the wave plate 70 on the first and second beams 86 and 88 can be seen by comparing FIG. 5B, which shows the central position and polarization of the beams prior to entering the wave plate 70, and FIG. 5C, which shows the beams just after exiting the wave plate. It is thus seen that the central position of the first beam 86 upon exiting the wave plate remains unchanged from its central position immediately prior to entering the wave plate, while its polarization upon exiting the wave plate 70 is rotated 45° in a counterclockwise direction from the perspective viewed in FIG. 5C. Correspondingly, it is seen that the central position of the second light beam 88 upon exiting the wave plate 70 also remains unchanged from its position immediately prior to entering the wave plate, while the polarization of the second beam upon exiting the wave plate is rotated 45° in a counter-clockwise clockwise direction, as seen in FIG. 5C.

After exiting the wave plate 70, both beams 86 and 88 are introduced into the Faraday rotator 76. As mentioned, the Faraday rotator 76 shown in FIG. 4 is a garnet stone. The garnet stone may be latching or non-latching. The Faraday rotator 76 is used to rotate the polarization of a light beam that propagates through it by a predetermined angle in a specified direction. In the present embodiment, the Faraday rotator 76 rotates the polarization of light beams that propagate through it in the forward propagation direction by the same angle as the wave plate 70, but in a direction opposite the direction of rotation caused by the wave plate 70 when light propagates through it in the forward direction. Thus, the Faraday rotator 76 of FIG. 4 rotates the polarization of incident light beams propagating in the forward direction clockwise by 45° when viewed head-on. And, this rotation is the same magnitude of the angle of rotation caused by the wave plate 70 as discussed above, but opposite in direction.

As a result of passage through the Faraday rotator 76, both the first and second beams 86 and 88 are affected, which can be seen by comparing FIGS. 5C and 5D, which show the beams before and after passage through the Faraday rotator, respectively. This comparison shows that the central position of the first beam 86 after passage through the Faraday rotator 76 remains unchanged from its position immediately prior to entering the Faraday rotator (FIG. 5C), while its post-passage polarization is rotated 45° in the clockwise direction. Correspondingly, it is seen that the central position of the second beam 88 upon exiting the Faraday rotator 76 also remains unchanged from its position immediately prior to entering the Faraday rotator, while its polarization is also rotated 45° in the clockwise direction.

The first and second beams 86 and 88 maintain the central positions and polarizations shown in FIG. 5D upon exiting the Faraday rotator 76 and entering the second beam displacer 80 as the fifth stage of the PBCI 50 for passage therethrough. In the present embodiment, the second beam displacer 80 is physically similar to the first beam displacer, being composed of a birefringent crystal having differing refractive indices for light beams that pass through it with differing polarizations.

Passage of the first and second beams 86 and 88 through the second beam displacer 80 affects the beams in a manner similar to their passage through the first beam displacer 60. As a result of passage of the first beam 86, the central position and polarization of the beam, as the Y-Z plane-polarized O-beam, is not affected. Thus, upon its exit from the second beam displacer 80, as shown in FIG. 5E, the beam is unchanged. As a result of passage of the second beam 88, the beam maintains its original polarization, but its position is shifted further toward the first beam 86 as a result of the different refractive index encountered by the second beam, as the X-Z plane-polarized E-beam. In the present embodiment, the second beam displacer 80, being a birefringent crystal similar to the first beam displacer 60, causes the second beam 88 to converge toward the first beam 86 a distance along the X-axis that is half the original distance (2D) that existed between the beams upon their previous entry into the first beam displacer. In the present embodiment, this distance is the walk-off distance D, which equals the walk-off distance D of the first and second beams 86 and 88 that occurred in the first beam displacer 60.

Note that the present embodiment includes first and second beam displacers that are similarly constructed such that the first beam or second beam behave similarly in either the first or second beam displacer. In other embodiments, however, the first and second beam displacers can be configured such that their properties vary from one another, thereby causing the first and second beams to behave differently and to have mutually different walk-off distances.

In light of the above, it is seen that the original distance between the first and second beams 86 and 88 in the X-direction is 2D, as seen in FIG. 5A. When the second beam 88 propagates through the first beam displacer 60, it is deflected until it moves closer to the first light beam by a distance D in the X-axis direction. Subsequently, when the second beam 88 propagates through the second beam displacer 80, it deflects further toward the first beam 86 a distance D in the X-axis direction until it combines with the first beam.

The combination of the first and second beams 86 and 88 creates a single, dualpolarized beam 96 having plane polarizations that are the same as each of the first and second beams prior to combination. The combined beam 96, shown in FIG. 5E, exits the second beam displacer 80 and is then transmitted through the third collimator 84 and into an optical fiber or similar component (not shown) that is coupled to the third collimator. Thus, the overall result of transmitting a first beam 86 that polarized along a first plane and a second beam 88 that is polarized along a second plane orthogonal to the first plane, through the components of the PBCI 50 in a forward propagation direction as described above is the combined beam 96 that is polarized along two orthogonal planes, as shown in FIG. 5E.

It is also noted, that in the present embodiment, the first beam displacer 60 and the second beam displacer 80 have optical axes 61 and 81, respectively, that are preferably not in alignment with either of the first and second beams 86 and 88 in order to optimize operation of the beam displacers. In one embodiment, the optical axes 61 and 81 are aligned alike, and in one particular embodiment, each optical axis has a value of 45°.

Reference is now made to FIG. 7 in describing another operational state of the present PBCI 50. In addition to providing the beam combining function discussed above, a the PBCI 50 also uses the same components to perform an optical isolation operation. As shown in FIG. 7, the isolator function of the PBCI 50 is used to block transmission of light into a fiber when it is traveling in the backward propagation direction as indicated by the arrow 98, which is opposite the forward propagation direction shown in FIG. 4. Such light is often referred to as back-reflected light. Light beams traveling in the backward propagation direction will propagate through the six stages of the PBCI. For ease of reference, the stages have been renumbered. The stages are numbered in the order in which light propagates through each of them when traveling in the backward propagation direction indicated by the arrow 98. In the first stage, a combined beam 100 of light that is plane-polarized along two orthogonal planes is transmitted in the backward propagation direction through the third collimator 84. The combined beam 100 originates from an optical fiber (not shown) that is coupled to the third collimator. The combined beam 100 is collimated as it propagates through the third collimator 84.

FIG. 8A is a head-on view of the combined beam 100 showing the central position and polarizations of the combined beam after it has exited the third collimator 84 and before it enters the second beam displacer 80. As shown, the combined beam 100 is polarized in the YZ-plane and therefore oscillates along the Y-axis while the beam propagates in the Z-direction. Further, the combined beam 100 is also polarized in the XZ-plane and therefore oscillates in the X-axis while the beam propagates in the Z-direction.

The second stage of the PBCI 50 in the present embodiment is the second beam displacer 80, which receives the combined beam 100 (traveling in the backward propagation direction) from the third collimator 84. The detailed operation of the second beam displacer 80 was discussed above. As a result of its passage through the second beam displacer 80, the combined beam 100 is split into a first beam 106 and a second beam 108. The first beam 106 is polarized in the Y-Z plane and oscillates along the Y-axis. Because of its polarization, the first beam 106 in the present embodiment is referred to as the ordinary beam (O-beam) in the second beam displacer 80. Thus, the first beam 106 propagates without deflection through the second beam displacer 80.

In contrast, the second beam 108 is polarized in X-Z plane and oscillates along the X-axis. Because of its polarization and the nature of the second beam displacer 80, the second beam 108 in the present embodiment is referred to as the extraordinary beam (E-beam) in the second beam displacer. Thus, the second beam displacer 80 deflects the second beam 108 along the X-axis a walk-off distance D.

FIG. 8B shows the polarization of the first and second beams 106 and 108 after exiting the second beam displacer 80. (Note that FIGS. 8B–8E are each head-on views of the first and second beams 106 and 108 as they progress through the PBCI 50, according to the present embodiment.) FIG. 8B shows that the central position of the first beam 106, marked by a dot, is the same as the original combined beam 100 that was transmitted into the third collimator 84. The polarization of the first beam 106 is the same as the component of the combined beam 100 that previously oscillated along the Y-axis. In contrast, the central position of the second beam 108 is deflected a distance D along the X-axis below the position of the original combined beam 100. The polarization of the second beam 108, however, is the same as the component of the combined beam 100 that previously oscillated along the X-axis.

The first and second beams 106 and 108 are next directed through the third stage of the PBCI 50, the Faraday rotator 76. The angle and direction of rotation imparted to a light beam that is traveling in the backward propagation direction through the Faraday rotator 76, as in FIG. 7, is the same as when light travels through the Faraday rotator in the forward propagation direction, as in FIG. 4. Thus, as the first beam 106 is transmitted through the Faraday rotator 76 in the second propagation direction, the polarization of the first beam is rotated through a predetermined angle in a specified direction. Similarly, the polarization of the second beam 108 is also rotated through a predetermined angle in a specified direction. As mentioned earlier, in one embodiment, the angle of rotation of the polarization of the first and second beams 106 and 108 is 45° and the direction of the rotation is clockwise when the beams are viewed head-on.

FIG. 8C illustrates the central position and polarization of the first and second beams 106 and 108 after they exit the Faraday rotator 76. As shown, the central position of the first and second beams 106 and 108 remain the same as before the beams entered the Faraday rotator 76. However, the polarizations of both the first and second beams after exiting the Faraday rotator 76 have been rotated 45° clockwise with respect to their respective polarizations immediately prior to entering the Faraday rotator.

Next, the first and second light beams 106 and 108 enter the fourth stage of the PBCI 50, which is the wave plate 70.

As has been discussed, the wave plate 70 in the present embodiment includes a half-wave plate that has an optical axis of 22.5°, as shown in FIGS. 7 and 8D, and is operable to rotate the polarization of the first and second beams 106 and 108 through a predetermined angle in a specified direction as the beams pass through the wave plate. Generally, the magnitude of angular rotation of the polarization of light beams as they pass through the wave plate 70 in either the forward propagation direction (as in FIG. 4) or the backward propagation direction (as in FIG. 7) is the same in the present embodiment. However, the direction of polarization rotation caused by the wave plate 70 when light beams travel through in the forward propagation direction is opposite the rotation direction when the light beams travel through in the backward propagation direction.

In light of these principles, then, the light beams 106 and 108 traveling through the wave plate 70 in the backward propagation direction are rotated through 45° in the present embodiment, as was the case with light beams directed in the forward propagation direction in FIG. 4. However, the direction of this polarization rotation is in the clockwise direction for both the first and second beams 106 and 108, which results in the polarization arrangement shown in FIG. 8D, wherein the first beam is polarized to oscillate along the X-axis and the second beam oscillates along the Y-axis. The central positions of each beam remain unchanged from their previous positions they had upon exiting the Faraday rotator 76 during the third stage. Thus, it is seen that the combination of the Faraday rotator 76 and wave plate 70 of the third and fourth stages, respectively, rotate the polarization of the first beam by 90° clockwise, ie., in a direction from the Y-axis to the X-axis. The polarization of the first beam has changed from YZ-plane polarization to XZ-plane polarization. Similarly, the combination of the Faraday rotator 76 and the wave plate 70 rotate the polarization of the second beam by 90° clockwise, ie., in a direction from the Y-axis to the X-axis. The polarization of the second beam changes from YZ-plane polarization to XZ-plane polarization.

After passage through the wave plate 70, both the first and second beams 106 and 108 are next introduced into the fifth stage of the PBCI 50, which is the first beam displacer 60. As shown in FIG. 8D, prior to entering the first beam displacer 60, the first and second beams are separated by a distance D in the X-axis direction. Further, because of the polarization of the first and second light beams 106 and 108, as well as the physical properties of the first beam displacer 60, the first beam is characterized as the E-beam, while the second beam is characterized as the O-beam. As such, the second beam 108 travels without deflection through the first beam displacer 60, while the first beam 106 is deflected toward the second beam along the XZ-plane in the X-axis direction. The walk-off distance traveled by the first beam 106 is D as seen by inspection of FIGS. 8A–8E.

Because the distance between the first and second beams 106 and 108 prior to entering the first beam displacer 60 was D, passage through the first beam displacer 60 deflects the first beam into the second beam such that, upon exiting the first beam displacer 60, the first and second beams share the same position and therefore once again form the combined beam 100, as seen in FIG. 8E. The polarizations of the first and second beams 106 and 108 are not further affected by passage through the first beam displacer 60. Therefore, the output of the first beam displacer 60 is the combined beam 100 that is polarized along two orthogonal planes. The combined beam 100 that exits the first beam displacer 60 is displaced by a distance D in the XZ-plane in the X-axis direction from its original point of entry into the PBCI 50 at the third collimator 84. This displacement is caused by the various operations performed on the combined beam 100 and its constituent first and second beams 106 and 108 by the various components of the PBCI 50 as detailed above. Because of this displacement the combined beam 100, upon exiting the first beam displacer 60, is transmitted between the first and second collimators 52 and 54 that make up the sixth stage of the PBCI 50. This prevents the combined beam 100 from being transmitted into the apertures of either of the first and second collimators 52 and 54. This, in turn, prevents back-reflection from exiting the PBCI and impinging upon other components, thereby completing the optical isolator function of the PBCI of the present invention.

Figure 9:
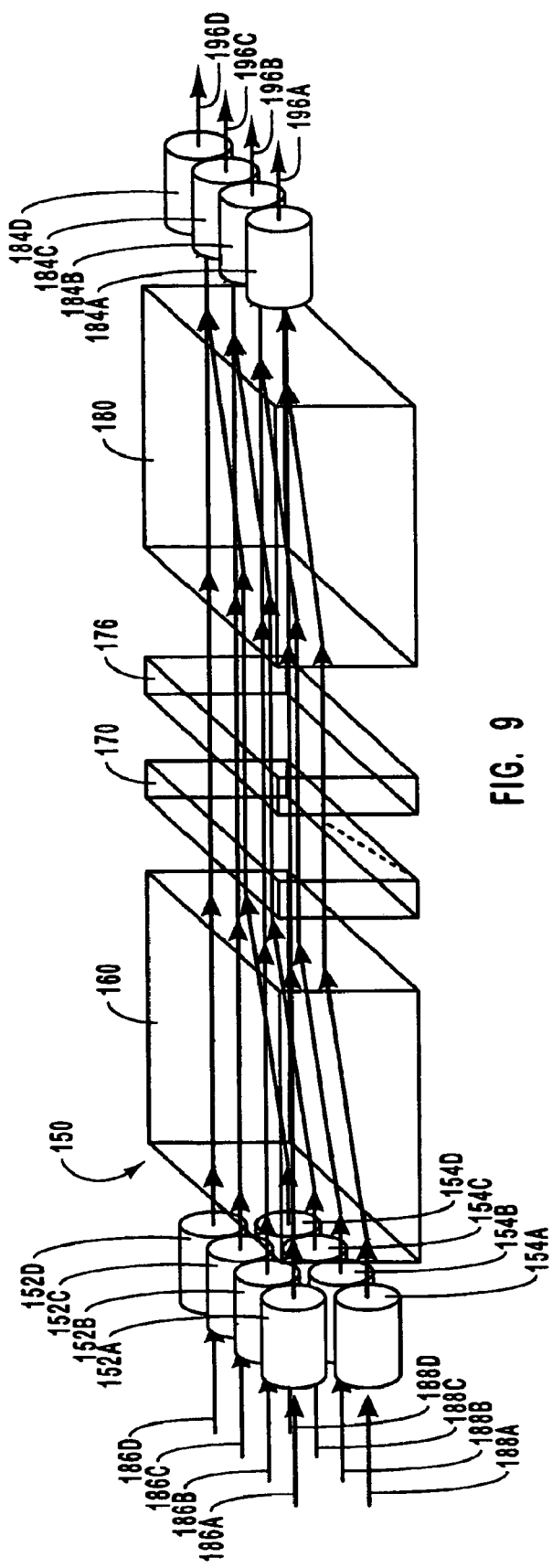
FIG. 9 is a block diagram of the stages of a multiport integrated polarization beam combiner and optical isolator, according to one embodiment.

Reference is now made to FIG. 9, which depicts another embodiment of the present invention. In certain applications, it is desirable to provide an array of PBCI structures to enable beam combination and optical isolation for multiple streams of optical beams. FIG. 9 depicts such a PBCI array, generally depicted at 150. The PBCI 150 includes a plurality of components configured to receive and combine multiple beam pairs, while also isolating back-reflected light. In detail, the PBCI 150 includes an array of first collimators 152A–D and second collimators 154A–D, both of which are positioned in series with a first beam displacer 160. A wave plate 170, Faraday rotator 176, and second beam displacer 180 are placed successively in series with the first beam displacer 160. Finally, an array of third collimators 184A–D is positioned in series after the second beam displacer 180.

An array of plane-polarized first beams 186A–D of light and an array of second beams 188A–D of light are shown entering and passing though the above components of the PBCI 150 to result in an array of dual-polarized combined beams 196A–D of light that exits the PBCI via the third collimator array 184A–D. The process of combining each of the array of first beams 186A–D with the respective one of the array of second beams 188A–D into one of an array of combined beams 196A–D occurs in similar fashion to that described above, with each PBCI component performing a specified operation of the light beams. Correspondingly, the process of optical isolation of back-reflected light beams is also performed by the PBCI 150 in a manner similar to that described in previous embodiments. The physical dimensions of the first beam displacer 160, the wave plate 170, the Faraday rotator 176, and the second beam displacer 180 have been increased to receive and manipulate each of the first and second beams 186A–D and 188A–D, as well as any back-reflected beams.

Note that the respective sizes of each of these components can be specifically sized to receive and manipulate a specified number of light beams, either smaller or larger, from what is explicitly shown in FIG. 9. In addition, though the embodiment of FIG. 9 shows them being arranged horizontally with respect to one another, the first and second light beams 186 and 188 can also be vertically stacked, or arranged in some combination of these arrangements. Thus, these and other modifications within the spirit of the present invention are contemplated.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within is: their scope.

What is claimed is:

1. A beam combiner apparatus, comprising:

first and second adjacent optical fibers that are configured to respectively transmit first and second light beams in a forward propagation direction;

a first beam displacer that receives and deflects at least one of the first and second light beams; and a second beam displacer optically coupled to the first beam displacer through a wave plate and a Faraday rotator, wherein the wave plate and the Faraday rotator rotate the polarization of the first and second light beams by equal amounts, and wherein the second beam displacer receives and combines the first and second light beams.

2. The beam combiner apparatus of claim 1, wherein the first beam displacer and the second beam displacer are composed of a birefringent crystal.

3. The beam combiner apparatus of claim 1, wherein the wave plate is a half wave plate.

4. The beam combiner apparatus of claim 1, wherein the Faraday rotator includes a garnet stone.

5. The beam combiner apparatus of claim 1, wherein the wave plate is disposed between the first beam displacer and the Faraday rotator.

6. The beam combiner apparatus of claim 1, wherein the Faraday rotator is disposed between the first beam displacer and the wave plate.

7. The beam combiner apparatus of claim 1, wherein the wave plate includes a birefringent crystal.

8. A beam combiner apparatus, comprising:

a first optical fiber coupled to a first lens that transmits a first polarized light beam along a path in a forward propagation direction;

a second optical fiber coupled to a second lens that transmits a second polarized light beam along a path in the forward propagation direction;

a first birefringent crystal that is positioned adjacent the first and second lenses and receives the first and second light beams, wherein the first birefringent crystal deflects the second light beam toward the first light beam and transmits the first and second light beams in the forward propagation direction;

a second birefringent crystal that is positioned to rotate the polarization of the first and second light beams received from the first birefringent crystal and to transmit the first and second light beams along the path in the forward propagation direction;

a garnet stone that is positioned to rotate the polarizations of the first and second light beams received from the second birefringent crystal and transmit the first and second light beams along the path in the forward propagation direction;

a third birefringent crystal that is positioned to combine the first and second light beams received from the garnet stone and transmit the combined light beam in the forward propagation direction; and a third lens that is positioned adjacent the third birefringent crystal to transmit the combined light beam in the forward propagation into a third optical fiber, and wherein a third light beam transmitted through tho third optical fiber along a path in a backward preparation direction is transmitted through the beam combiner apparatus such that the third light beam does not enter one of the first and second lens.

9. The apparatus of claim 8, wherein the garnet stone is adjacent the first birefringent crystal, and the second birefringent is adjacent the third birefringent crystal.

10. The apparatus of claim 8, wherein the first light beam is polarized along a first plane and the second light beam is polarized along a second plane, said second plane being orthogonal to the first plane.

11. The apparatus of claim 8, wherein each of the first and second birefringent crystals has an optical axis of 45°.

12. The apparatus of claim 8, wherein the first and third birefringent crystals have the same optical axis.

13. The apparatus of claim 8, further comprising:

a plurality of pairs of lenses adjacent the first birefringent crystal; and a plurality of lenses adjacent the third birefringent crystal wherein each lens adjacent the third birefringent crystal corresponds to a pair of lenses adjacent the first birefringent crystal.

14. A beam combiner apparatus, comprising:

a first optical fiber that transmits a first polarized light beam along a path in a forward propagation direction;

a second optical fiber that transmits a second polarized light beam along a path in the forward propagation direction simultaneous to the transmission of the first light beam;

a first birefringent crystal that is positioned adjacent the first and second lenses and receives the first and second light beams, wherein the first birefringent crystal deflects the second light beam toward the first light beam and transmits the first and second light beams in the forward propagation direction;

a second birefringent crystal that is positioned to rotate the polarization of the first and second light beams received from the first birefringent crystal and to transmit the first and second light beams along the path in the forward propagation direction;

a garnet stone that is positioned to rotate the polarizations of the first and second light beams received from the second birefringent crystal and transmit the first and second light beams along the path in the forward propagation direction; and a third birefringent crystal that is positioned to combine the first and second light beam received from the garnet stone and transmit the combined light beam in the forward propagation direction to a third optical fiber.

15. A beam combiner apparatus as defined in claim 14, wherein a third polarized light beam transmitted through the third optical fiber along a path in a backward propagation direction is transmitted through the beam combiner apparatus such that the third light beam does not enter either of the first and second lenses.

16. A beam combiner apparatus as defined in claim 14, wherein the first optical fiber is optically coupled to a first lens, and wherein the second optical fiber is optically coupled to a second lens, and wherein the third optical fiber is optically coupled to a third lens that is positioned adjacent the third birefringent crystal to transmit the combined light beam in the forward propagation into the third optical fiber.

17. A beam combiner apparatus as defined in claim 14, wherein the second optical fiber is adjacent the first optical fiber.

* * * * *

UNITED STATES PATENT AND TRADEMARK OFFICE
CERTIFICATE OF CORRECTION

PATENT NO. : 6,919,989 B1
APPLICATION NO. : 10/697725
DATED : July 19, 2005
INVENTOR(S) : Deng et al.

It is certified that error appears in the above-identified patent and that said Letters Patent is hereby corrected as shown below:

Column 2
Line 23, before "direction" remove "e"
Line 42, after "first" remove "beam"

Column 4
Line 4, before "generally" change "is" to --are--

Column 6
Line 57, after "refraction" change "no" to --$n_o$--

Column 7
Line 30, change "no" to --$n_o$--

Column 9
Line 27, before "polarized" insert --is--

Column 10
Line 18, before "X-Z" insert --the--

Column 11
Line 31, change "ie." to --i.e.--
Line 36, change "ie." to --i.e.--

Column 12
Line 65, remove "is:"

UNITED STATES PATENT AND TRADEMARK OFFICE
CERTIFICATE OF CORRECTION

PATENT NO. : 6,919,989 B1
APPLICATION NO. : 10/697725
DATED : July 19, 2005
INVENTOR(S) : Deng et al.

It is certified that error appears in the above-identified patent and that said Letters Patent is hereby corrected as shown below:

Column 13
Line 60, change "tho" to --the--
Line 61, change "preparation" to --propagation--

Signed and Sealed this

Sixteenth Day of October, 2007

JON W. DUDAS
*Director of the United States Patent and Trademark Office*